United States Patent
Lang

[11] Patent Number: 5,116,562
[45] Date of Patent: * May 26, 1992

[54] METHOD FOR REPRODUCING PAINTINGS AND THE LIKE

[75] Inventor: Stefan Lang, Scarborough, Canada

[73] Assignee: Artagraph Reproduction Technology Inc., Ontario, Canada

[*] Notice: The portion of the term of this patent subsequent to Nov. 20, 2008 has been disclaimed.

[21] Appl. No.: 599,173

[22] Filed: Oct. 17, 1990

Related U.S. Application Data

[63] Continuation-in-part of Ser. No. 325,962, Mar. 20, 1989, Pat. No. 4,971,743.

[51] Int. Cl.⁵ .............................................. B29C 43/20
[52] U.S. Cl. .................................. 264/132; 156/59; 156/80; 264/28; 264/225; 264/245; 264/324; 264/348; 425/DIG. 9
[58] Field of Search ............... 264/28, 225, 226, 227, 264/220, 245, 257, 132, 346, 348, 237, 324, 345, 319; 425/DIG. 9, 407; 156/58, 59, 80

[56] References Cited

U.S. PATENT DOCUMENTS

| | | | |
|---|---|---|---|
| 2,673,371 | 3/1954 | Uhlig | 425/128 |
| 2,765,512 | 10/1956 | Nesbit | 264/28 |
| 3,989,790 | 11/1976 | Bruner et al. | 264/255 |
| 4,001,062 | 1/1977 | Iisaka et al. | 264/225 |
| 4,091,154 | 5/1978 | Hirai | 264/245 |
| 4,285,744 | 8/1981 | Rudolph et al. | 264/25 |
| 4,308,224 | 12/1981 | Becker | 264/220 |

FOREIGN PATENT DOCUMENTS

| | | | |
|---|---|---|---|
| 57-126624 | 8/1982 | Japan | 264/132 |
| 1107401 | 3/1968 | United Kingdom | 264/132 |

Primary Examiner—Jeffery Thurlow
Assistant Examiner—Mathieu Vargot
Attorney, Agent, or Firm—Riches, McKenzie & Herbert

[57] ABSTRACT

A new process for producing a reproduction of a painting or the like wherein the reproduction has a relief surface which imitates the relief surface of the painting or the like. Heat and pressure are applied simultaneously to an assembly consisting of a mold of the painting, a colored sheet for coloring the reproduction and a substrate to retain the reproduction. Subsequent to this step, shock cooling is applied. The reproduction thus produced does not suffer from the rebound effect of the prior art and good color integrity is maintained.

17 Claims, 1 Drawing Sheet

METHOD FOR REPRODUCING PAINTINGS AND THE LIKE

RELATED APPLICATIONS

This application is a continuation-in-part application of my U.S. Pat. application Ser. No. 325,962 filed on Mar. 20, 1989, now U.S. Pat. No. 4,971,743.

BACKGROUND OF THE INVENTION

1. Field Of The Invention

This invention relates generally to a new and improved process for reproducing an original painting or the like, and more particularly, to an improved process for reproducing an oil or acrylic painting or the like, from the original artwork to produce a reproduction which has a relief surface and texture to it which is identical to the relief surface and texture of the original artwork and which maintains good colour integrity.

2. Description Of The Prior Art

Various methods have been prepared to copy or reproduce an oil or acrylic painting or the like, in order to produce a copy which is the same as or similar to the original.

Such copies generally fall within two categories. The first category includes copies of the artwork which lack surface texture or relief dimensions of the original. The second category includes copies which attempt to copy the relief dimensions or surface texture of the original artwork. It is to the second category to which this invention is directed.

The first category includes such copies broadly classified as artistic polychrome prints, photographs and the like and while these may be produced quite inexpensively, and while they exhibit good colour integrity, they lack the relief dimensions or surface texture of the original and thus are not as acceptable as would be a reproduction which duplicated faithfully the surface texture of the original.

The second category has in fact met with limited success although the quality of these copies in reproductions has not been high. The process for producing such copies generally involve the production of a type of plastic transparent layer which is given texture by using a mold made from an original painting (see patents DE-PS 494,894; FR-PS No. 1,521,466; DE-AS No. 2,019,699 and DE-OS No. 2,352,966).

With these processes, problems arose with colour fidelity and the effects created by the transparent relief layer. Attempts have been made to overcome these problems as shown in French patent 1,493,516; French patent 1,548,337 and Canadian patent 990,506 granted on Jun. 8, 1976 to Dimension Weld Int. Corp. which shows the use of a thermoplastic transparent sheet.

Another process has been disclosed in U.S. Pat. No. 4,285,744 granted on Aug. 25, 1981. The product of this patent to Rudolf et al. does not exhibit the same degree of relief as the finished product of the present invention. This difference is as a result of the shock cooling step which is a part of the present process but is not a part of the process of Rudolf et al. Rudolf uses what would be conventional cooling of the product by allowing it to cool to room temperature by exposing the product to ambient air. The present inventor has found that with this process, the rebound effect will occur which decreases the relief of the reproduction over time.

More recently, a process was disclosed in U.S. Pat. No. 4,308,224 which issued on Dec. 29, 1981 and which was developed to produce such reproductions of reasonable price and of acceptable fidelity.

This patent discloses a process which uses a relief mold taken from the original and a thermoplastic foil imprinted with the colour picture corresponding to the original. The foil, while being heated, was placed with its imprinted side down on the relief mold and a textile layer placed over the foil.

The combination was then heated causing the flowable component of the textile layer to flow into the relief surface of the mold, thus duplicating the texture of the original painting.

However, this process only partially duplicated the relief dimensions of the original artwork and also, after standing, the texture tended to reduce.

SUMMARY OF THE INVENTION

Accordingly, it is an object of the present invention to at least partially overcome these disadvantages by providing an improved process for reproducing paintings and the like which reproduces the artwork in colour integrity, relief surface and texture, and is quite cost effective.

It is a further object of his invention to provide an improved process for producing a reproduction of a painting and the like, which reproduction has a relief surface and texture faithful to the original artwork.

A further object of the invention is to provide a process for producing a reproduction of a painting and the like which produces good quality reproductions of consistent quality and which is susceptible to industrial application.

To this end, in one of its aspects, the invention provides a method for producing a reproduction of a painting or the like, the reproduction having a relief surface imitating the relief surface of the painting or the like, the process comprising the steps of applying heat and pressure to an assembly consisting of a mold of the oil painting or the like, a coloured sheet for colouring the reproduction, a substrate to retain the reproduction, and then shock cooling the assembly.

A further object of the invention is to provide a method for producing a reproduction of a painting, said reproduction having a relief surface imitating the relief surface of said painting, said process comprising the steps of:

(a) placing a silicone mat on a table of a hydraulic press;

(b) placing a mold of said painting on the top of said silicone mat with the relief side up;

(c) placing a coloured sheet for colouring said reproduction on the top of said relief side of said mold;

(d) placing a substrate to retain the reproduction on the top of said coloured sheet;

(e) applying heat and pressure simultaneously to an assembly consisting of said mold of said painting, said colour sheet for colouring said reproduction, and said substrate to retain said reproduction; and (f) immediately thereafter shock cooling said assembly by contacting said assembly with cooling plates to permanently retain said relief surface texture on said substrate.

DESCRIPTION OF THE PREFERRED EMBODIMENT

The first step of the process of the present invention is to make a suitable mold or negative from the original painting or the like. The mold is generally made of silicone rubber and is quite hard and acts as a negative for the production of the reproductions at a subsequent stage.

The mold may be made by any well known process. One example is as follows. Molten mold material is poured over an original painting and then allowed to set or harden and dry for about 48 hours. Since the mold is made from the original painting, it will retain all the surface texture of the original artwork to impart such surface texture to subsequently produced reproductions.

The mold may also be made of any suitable material. A preferred material is a two component RTV silicone rubber which uses silicone rubber as the base, and dibutyl tin dilaurate (DBT) as the catalyst. This material exhibits a viscosity of about 50,000 cps and has a specific gravity of about 1.47. Its hardness on the standard durometer of about 60 and a tensile strength of about 56/800 kg/cm² allows it to withstand the pressures applied in the process. The material has an elongated percentage of about 130, a tear resistance of 7 to 140 kg/cm with a demonstrated wear shrinkage of about 0.2 to about 0.6. This provides good dimensional stability following multiple uses.

Colour separations are then prepared from the original painting using any well known method such as the Alexander method. A photograph of the painting is taken and a coloured positive transparently produced. The colour separation (using a four colour or a six colour or more, if required separation) is prepared using an offset process and then printed on a PVC coated sheet of about 300 microns in thickness.

Colour separations using a process camera, may also be made directly from the original artwork, without making a transparency, slide or the like. Basically, the original artwork is photographed using three filters, each of which lets through a preselected portion of light which is reflected from the image. The red filter is used for cyan printing; the magenta filter is used for green printing; and the blue filter is used for yellow painting. Black is the fourth colour and is used to make the greys and shadows neutral. The separations off the camera are continuous tones and a half tone screen is used to print the image. Any corrections are made to the filter by reducing the size of the dots with chemicals (referred to as dot etching) and after the etching process is complete, cromalins and press proofs are made.

Figure 1:
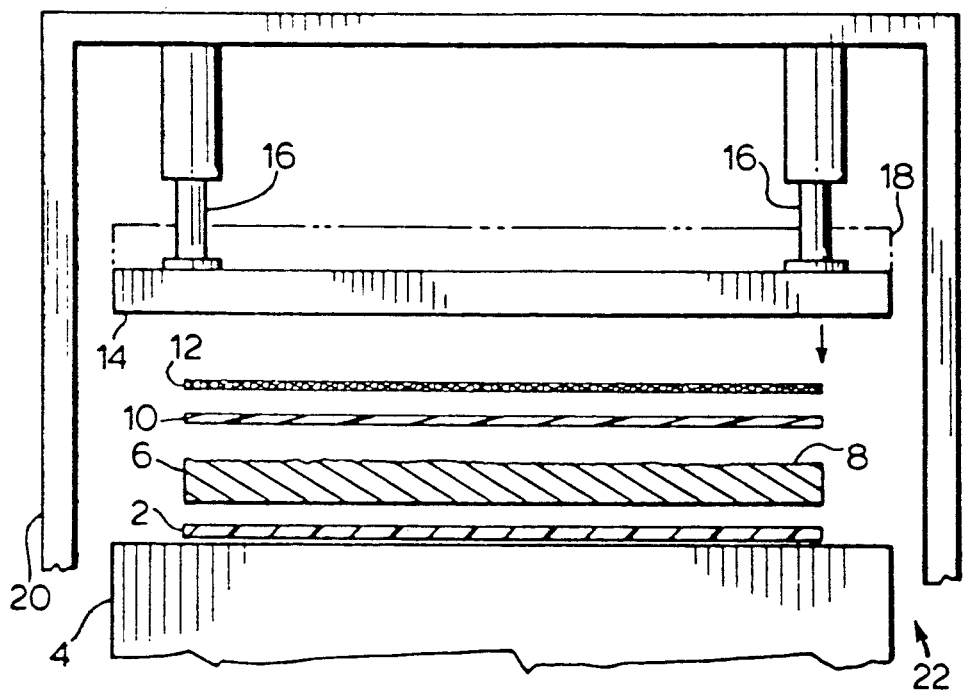
FIG. 1 is a schematic drawing of the assembly used in the process of the present invention.

Referring now to FIG. 1, there is shown a schematic representative of the method of producing the reproductions, by the preferred embodiment.

A hydraulic press generally indicated as 22 is used to produce the actual reproductions. The press 22 basically comprises a table 4, a heating plate 14 and a cooling plate 18 (shown in phantom lines).

Figure 2:
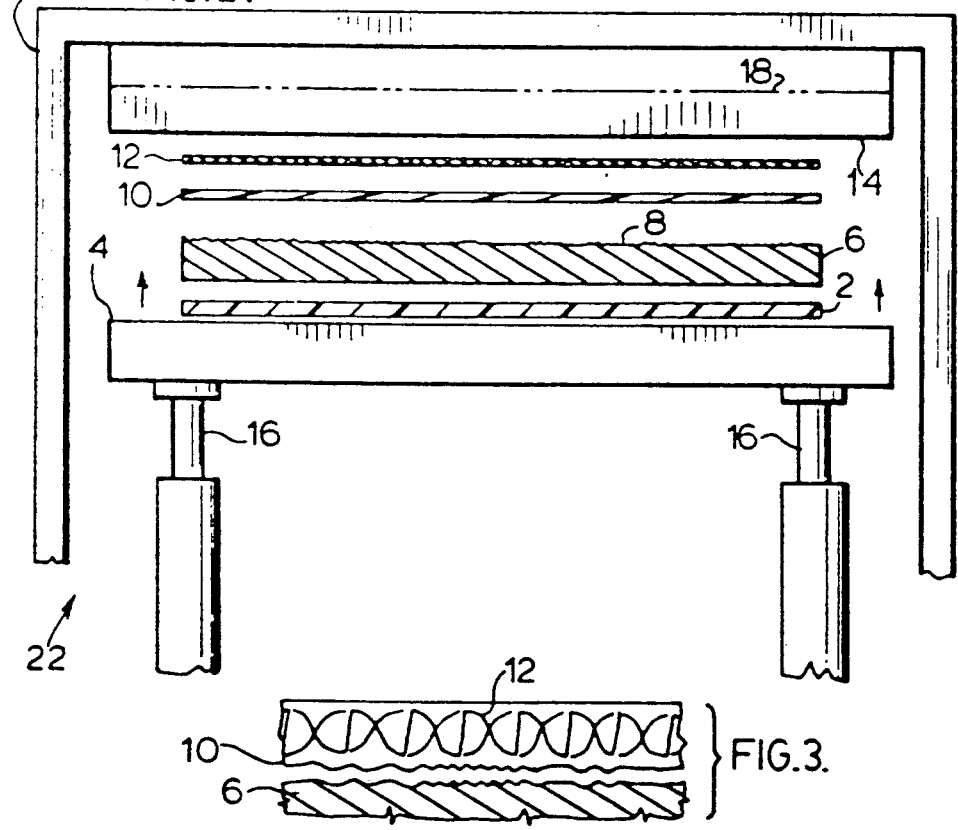
FIG. 2 is a schematic drawing of an alternate assembly used in the process of the present invention.

The press is capable of applying heat to the assembly by moving the heating plate 14 via pistons 16 affixed to housing 20, or could alternately, (as shown in FIG. 2), move table 4 upwardly to contact stationary heating plate 14. Heating plate 14 and cooling plate 18 are capable of moving laterally into or out of position to contact the assembly.

Preferably, a soft silicone mat 2 is placed over table 4. While not necessary, it is advisable as the soft silicone mat 2 will tend to equalize the applied pressure to produce a better quality product.

Mold 6 is then placed on top of the mat 2 with the relief side 8 of mold 6 in the up position. The printed PVC coated sheet 10 which has been printed with the applicable colour separations as explained hereinbefore, is placed on the top of the relief side 8 of mold 6, in perfect registration which is of course essential in any reproductive process.

Sheet 10 may be of any suitable material and PVC is preferred. It is preferably from about 2 to about 300 microns in thickness. One particularly useful material is KLOCKNEL (trade mark) PR 278/09 0/200 which has a matte 4/3 of 12 gauge and is a rigid highly impact modified PVC/PVAC copolymer.

The inks used to colour the sheet 10 may be any well known type but should be of high quality. Preferred inks are those demonstrating high scuff resistance and these designed to run on offset lithographic presses allowing an open time on the press of about 45 minutes and a drying time on the substrate of about 24 to about 36 hours. In addition to the four process colours (cyan, magenta, yellow and black), special colours may be mixed as required. The inks must be heat resistant to prevent damage during the pressing operation and should be of the fast drying type.

A piece of canvas 12 to be used as the substrate for the reproduction is then placed on top of the sheet 10. It is preferred that the canvas be coated with a flexible PVC laminate with a cotton sheeting on the back. A suitable formulation of a canvas is about 23.0 oz/sq.yd. of total weight with about 16.0 oz/sq.yd. of vinyl coating and a fabric back of about 5.4 oz/sq.yd.

Once the assembly has been completed, heat and pressure are applied to the assembly by using the heat plate 14. It is possible to accomplish this by two different means. First, heat plate 14 can be moved downwardly by the action of pistons 16 in housing 20 to apply heat and pressure to the assembly and in this embodiment, table 4 is stationary. An alternative embodiment is for table 4 to rise up and compress the assembly between movable table 4 and stationary heat plate 14.

Heat is applied by heat plate 14 which applies heat to the top of the assembly, that is, the canvas at a temperature of from about 160° C. to about 175° C. When these temperatures are applied, it has been found that the temperature of the sheet 10 reaches about 130° C.

It has been found that heat alone is not sufficient to produce the quality reproductions. Pressure must also be applied simultaneously with the heat and depending upon the size and type of picture, the pressure will be from about 10 to about 90 tons per square inch. For the average size picture, application of heat and pressure for about 60 to about 180 seconds is sufficient.

Figure 3:
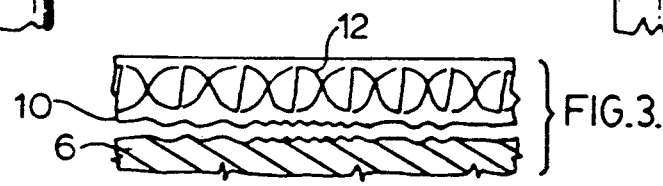
FIG. 3 is a sectional view of the reproduction and mold subsequent to the application of heat and pressure thereto.

Upon the application of heat and pressure, the sheet 10 melts as well as the PVC on the canvas substrate 12. The texture of the mold 6 is then imparted directly to the sheet and canvas which are now bonded and fused together. This type of lamination effectively transfers the relief surface of the mold to the reproduction as shown in FIG. 3.

Specifically, when heat is applied, the PVC coated sheet 10 and the PVC on the canvas substrate 12 become soft and flexible. As the pressure is applied, the backside of the PVC coated sheet 10 and the PVC on the canvas 12 are welded together and the thus bonded PVC coated sheet and canvas (as shown in FIG. 3) is pressed against the negative relief side of the mold 6. The PVC material covers and fills the negative hollows in the mold 6 which duplicate the surface texture and brush strokes of the original artwork.

The heat plate 14 is then removed from contact with the canvas 12. This is done by either moving the heat plate 14 upwardly away from canvas 12 by retracting piston 16 or by lowering the table 4. The heat plate 14 is then moved laterally away and cooling plate 18 (shown in dotted lines) is moved into the same position occupied previously by heat plate 14. Cooling plate 18 is then brought into contact with the assembly either by moving the pistons 16 downwardly or raising table 4 upwardly. It moves in exactly the same manner as heat plate 14.

The assembly is then subjected to shock cooling by contacting the cooling plate 18 with the assembly. This step of shock cooling is essential to the present invention. By shock cooling the assembly, this prevents the rebound effect from occurring and results in a flat or flattened picture. The use of the shock cooling is a substantial improvement over the prior art processes. The notable improvement of the present process resides in the production of a picture which has improved texture which reproduces the texture of the original artwork as closely as possible.

Shock cooling is when the assembly is cooled to room temperature more rapidly then merely allowing it to cool by exposure to room temperature. By exposing the assembly to rapid cooling, this shocks the assembly causing it to lose less of its texture than if the reproduction was allowed to cool by exposing it to room temperature.

The assembly may be cooled by any suitable means. As indicated hereinbefore, one method of shock cooling is to bring the assembly into contact with a cooling plate 18. The cooling plate 18 may be a conventional cooling plate which is chilled by a chiller unit (not shown). The time required to shock cool the assembly and the temperature required is not critical as long as the reproduction is shock cooled. The time and temperature of course depends on the size of the picture, the amount of texture on the reproduction and also the temperature to which the assembly was heated.

Several experiments have been conducted with respect to the shock cooling of the reproductions. For example, it has been found that if a standard chiller unit is cooled to about $-15°$ C. with a temperature on the cooling plate of about 8° C., the time required to shock cool and freeze the texture on the reproduction is about 90 seconds and the temperature on the surface of the reproduction will be about 25° C.

Increasing the time of the cooling step to about 120 seconds did not improve the texture of the reproduction to any noticeable extent nor did reducing the temperature on the cooling plate. However, a reduction of the cooling time to about 60 seconds or an increase of the picture reproduction temperature on the surface of the reproduction showed poorer results.

It is therefore concluded that to get the best results, the reproduction temperature should be reduced to at least room temperature in a relatively short period of time. While the time period is not necessarily critical, it is important to reduce that time period when compared to the time period which would have been required had the reproduction been allowed to cool to room temperature by exposing it to ambient air. Thus, it is not possible to put specific parameters and limitations on the shock cooling step. What is critical and what is required is to reduce the surface temperature of the reproduction faster than merely allowing it to be exposed to room air. Shock cooling may therefore be defined as a step reducing the surface temperature of the assembly fast enough to prevent the rebound effect on the reproduction which is faster than merely allowing the reproduction to cool by exposing it to room temperature.

This cooling or shocking step is different than that disclosed in U.S. Pat. No. 4,308.224 as explained hereinafter. It has been found that by shocking the reproduction by cooling, the rebound effect or memory of the base material is not seen thus allowing for a reproduction which comes closed to duplicating the original artwork.

In order to demonstrate the improvements of the present process over the prior art, a comparison, study was made between a reproduction made in accordance with the process of U.S. Pat. No. 4,308.24 and the present process. The following parameters were applied.

| STEPS | PROCESS OF U.S. Pat. No. 4,308,224 | NEW PROCESS |
|---|---|---|
| 1. Machine Temperature | 169° C.-172° C. | 169° C.-172° C. |
| 2. Temperature Of Mold | 130° C.-133° C. | 130° C.-133° C. |
| 3. Processing Time For Heat Plate | 90 sec. | 180 sec. |
| 4. Processing Time For Cooling Plate | none | 90 sec. |
| 5. Processing Temperature For Cooling Plate | none | $-5°$ C. |
| 6. Processing Pressure and Heat Plate | 30 tons | 40 tons |
| 7. Processing Pressure and Cooling Plate | none | 40 tons |

The texture height in the reproduction made in accordance with U.S. Pat. No. 4,308,224 including the height of the material measured 0.050 inches whereas the texture height of the reproduction of the present process including the height of the material measured 0.075 inches. The texture height of the prior art reproduction not including the material measured 0.025 inches whenever the texture height of the reproduction of the present process without the material measured 0.050 inches. It is clear from the results that the present process produces a reproduction having about a 66-67% improvement in the texture height than in the prior art.

While the invention describes and illustrates a preferred embodiment of the invention, it is to be understood that it is not to restricted.

What I claim is:

1. A method for producing a reproduction of a painting, said reproduction having a relief surface texture imitating the relief surface of said painting, said process comprising the steps of applying heat and pressure to an assembly consisting of a mold of said painting, a coloured sheet for colouring said reproduction, and a substrate to retain said reproduction, and then immediately thereafter shock cooling the assembly by contacting said assembly with cooling plates to permanently retain said relief surface texture on said substrate.

2. A method as claimed in claim 1 wherein said mold is made from an oil or acrylic painting.

3. A method as claimed in claim 2 wherein said mold is made of silicone rubber.

4. A method as claimed in claim 2 wherein said mold is made by pouring molten mold material over said painting, allowing said molten material to set and harden and removing said mold.

5. A method as claimed in claim 3 wherein said mold is a two component silicone rubber mold made of a silicone rubber base and a dibutyl tin dilaurate catalyst.

6. A method as claimed in claim 1 said coloured sheet is prepared by first preparing colour separations from said painting and printing said colour separations on a PVC sheet.

7. A method as claimed in claim 1 wherein said heat and pressure and cooling are applied using a hydraulic press.

8. A method as claimed in claim 1 comprising the steps of:
   (a) placing a silicone mat on a table of a hydraulic press;
   (b) placing said mold on the top of said silicone mat with the relief side up;
   (c) placing said coloured sheet on the top of the relief side of said mold;
   (d) placing said substrate on the top of said coloured sheet;
   (e) applying heat and pressure simultaneously to said assembly, and
   (f) then immediately shock cooling said assembly to permanently retain said relief surface texture on said substrate.

9. A method as claimed in claim 8 wherein said coloured sheet is a printed PVC sheet.

10. A method as claimed in claim 9 wherein said printed PVC sheet has been printed with the applicable colour separation corresponding to said original painting.

11. A method as claimed in claim 8 wherein said substrate is a canvas sheet coated with a flexible PVC laminate with a cotton backing.

12. A method as claimed in claim 8 wherein said heat is applied at about 160° C. to about 175° C. and said pressure is from about 10 to about 90 tons per sq. inch.

13. A method as claimed in claim 12 wherein said heat and pressure are applied for about 60 to about 180 seconds.

14. A method as claimed in claim 8 wherein said shock cooling is applied by contacting said assembly with a cooling plate at a temperature of about 0° C. for about 30 to about 75 seconds.

15. A method as claimed in claim 10 wherein said printing is done using heat resistant inks.

16. A method as claimed in claim 15 wherein said inks are fast drying inks.

17. A method for producing a reproduction of a painting, said reproduction having a relief surface imitating the relief surface of said painting, said process comprising the steps of:
   (a) placing a silicone mat on a table of a hydraulic press;
   (b) placing a mold of said painting of the top of said silicone mat with the relief side up;
   (c) placing a coloured sheet for colouring said reproduction on the top of said relief side of said mold;
   (d) placing a substrate to retain the reproduction on the top of said coloured sheet;
   (e) applying heat and pressure simultaneously to an assembly consisting of said mold of said painting, said colour sheet for colouring said reproduction, and said substrate to retain said reproduction; and
   (f) immediately thereafter shock cooling said assembly by contacting said assembly with cooling plates to permanently retain said relief surface texture on said substrate.

* * * * *